United States Patent
Yamada et al.

(10) Patent No.: US 7,215,710 B2
(45) Date of Patent: May 8, 2007

(54) IMAGE CODING DEVICE AND METHOD OF IMAGE CODING

(75) Inventors: Yoshihisa Yamada, Tokyo (JP); Okikazu Tanno, Tokyo (JP); Kohtaro Asai, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1205 days.

(21) Appl. No.: 09/764,312

(22) Filed: Jan. 19, 2001

(65) Prior Publication Data

US 2002/0001345 A1 Jan. 3, 2002

Related U.S. Application Data

(63) Continuation of application No. PCT/JP00/04263, filed on Jun. 28, 2000.

(51) Int. Cl.
*H04N 7/18* (2006.01)
(52) U.S. Cl. ............................... 375/240.24; 375/240.25
(58) Field of Classification Search ............................... 375/240.01–240.29
See application file for complete search history.

(56) References Cited

U.S. PATENT DOCUMENTS

| | | | |
|---|---|---|---|
| 6,459,811 B1 * | 10/2002 | Hurst, Jr. ..................... | 382/232 |
| 6,535,558 B1 * | 3/2003 | Suzuki et al. .......... | 375/240.12 |
| 6,603,815 B2 | 8/2003 | Suzuki et al. | |
| 6,831,948 B1 * | 12/2004 | Van Dijk et al. ........ | 375/240.12 |

FOREIGN PATENT DOCUMENTS

| EP | 0 600 446 A2 | 6/1994 |
|---|---|---|
| JP | 2-298184 A | 12/1990 |
| JP | 4-248787 A | 9/1992 |
| JP | 5-022710 A | 1/1993 |
| JP | 5-336511 A | 12/1993 |
| JP | 7-023393 A | 1/1995 |
| JP | 7-177511 A | 7/1995 |
| JP | 8-163555 A | 6/1996 |
| JP | 9-037243 A | 2/1997 |
| JP | 9-168155 A | 6/1997 |
| JP | 10-276430 A | 10/1998 |
| WO | WO-99/04573 A1 | 1/1999 |
| WO | WO-99/57906 A1 | 11/1999 |
| WO | WO 00/13418 A1 | 3/2000 |

OTHER PUBLICATIONS

T.-T. Chao et al., Society of Photo-Optical Instrumentation Engineers (SPIE), "Motion Compensated Spatio-Temporal Interpolation for Frame Rate Up-Conversion of Interlaced or Progressive Image Sequence," Visual Communications and Image Processing '94, Chicago, Sep. 25-29, 1994, SPIE vol. PRT 1, vol. 2308, 1994, pp. 682-693.

M. Irvin et al., "A New Generation of MPEG-2 Video Encoder ASIC and its Application to New Technology Markets," International Broadcasting Convention (Conf. Publ. No. 428) Amsterdam, Netherlands, Sep. 12-16, 1996, pp. 391-396.

\* cited by examiner

*Primary Examiner*—Andy Rao
(74) *Attorney, Agent, or Firm*—Birch, Stewart, Kolasch & Birch, LLP

(57) ABSTRACT

The input image controller reduces the frame rate of a motion image signal as a preprocessing, provides process information indicating the skipped frames and/or skipped fields to the image coder, wherein the image coder codes, by use of the MPEG 2 method, the motion image signal whose frame rate has been reduced, and outputs the data which is in conformity with the MPEG 2 method and includes overhead information on the basis of the process information.

25 Claims, 7 Drawing Sheets

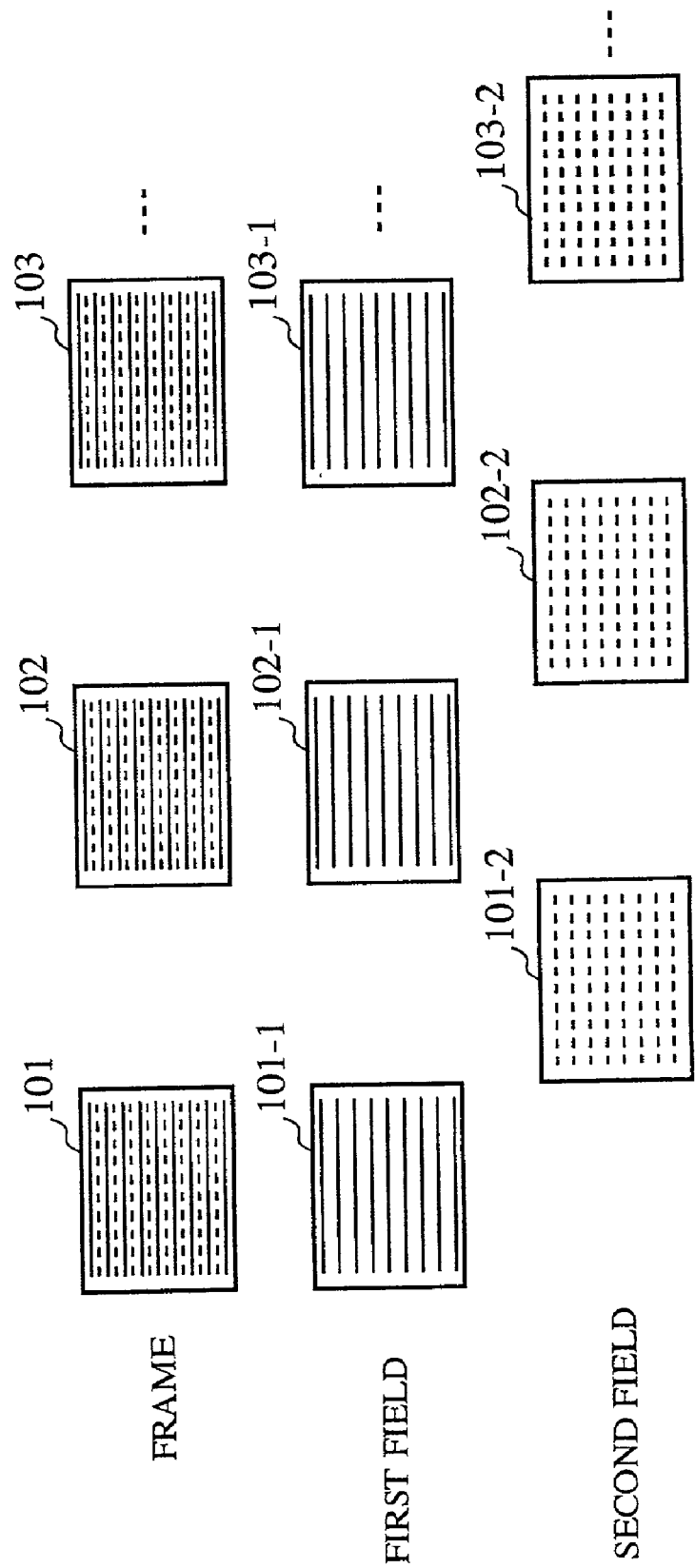

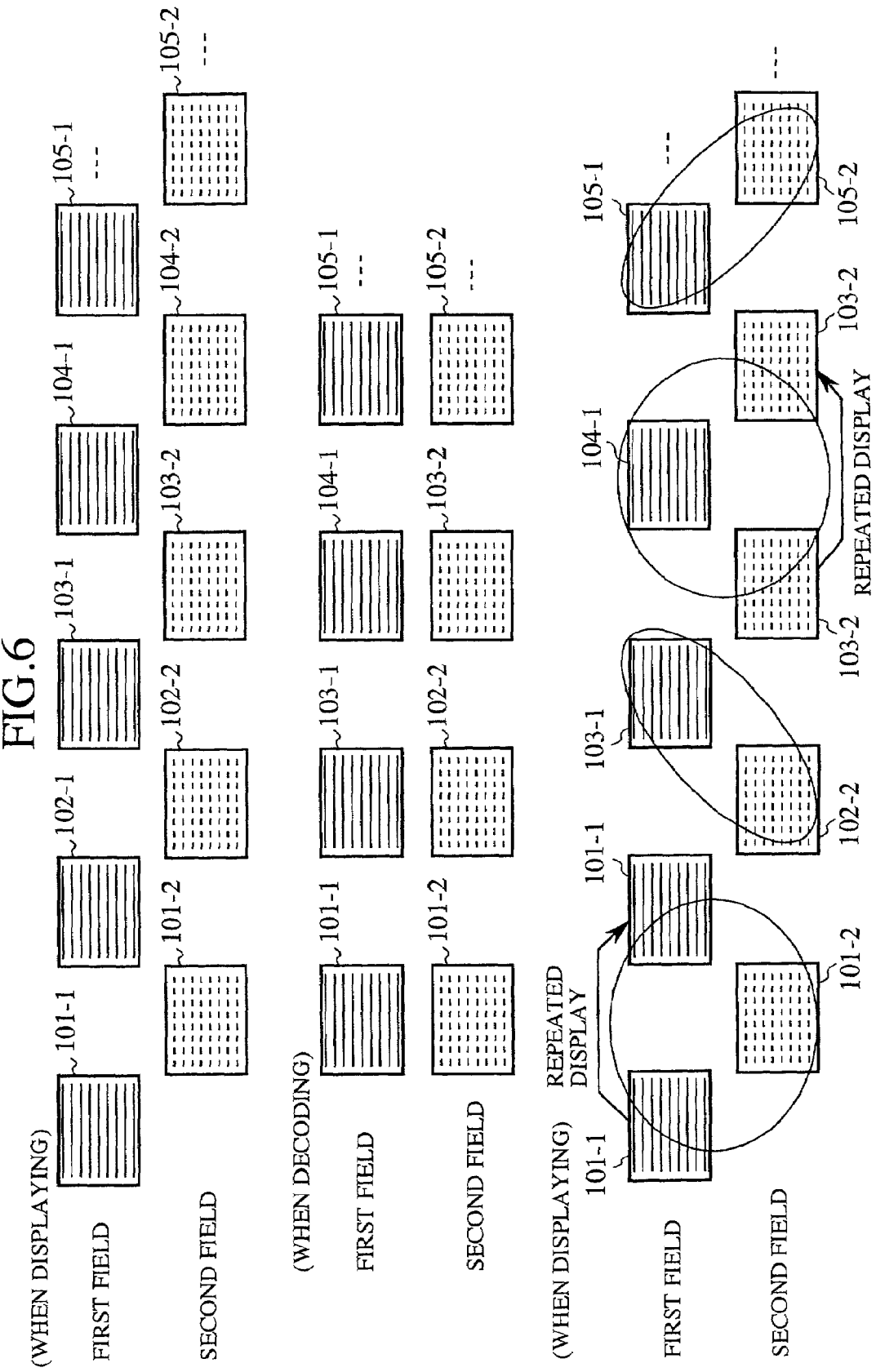

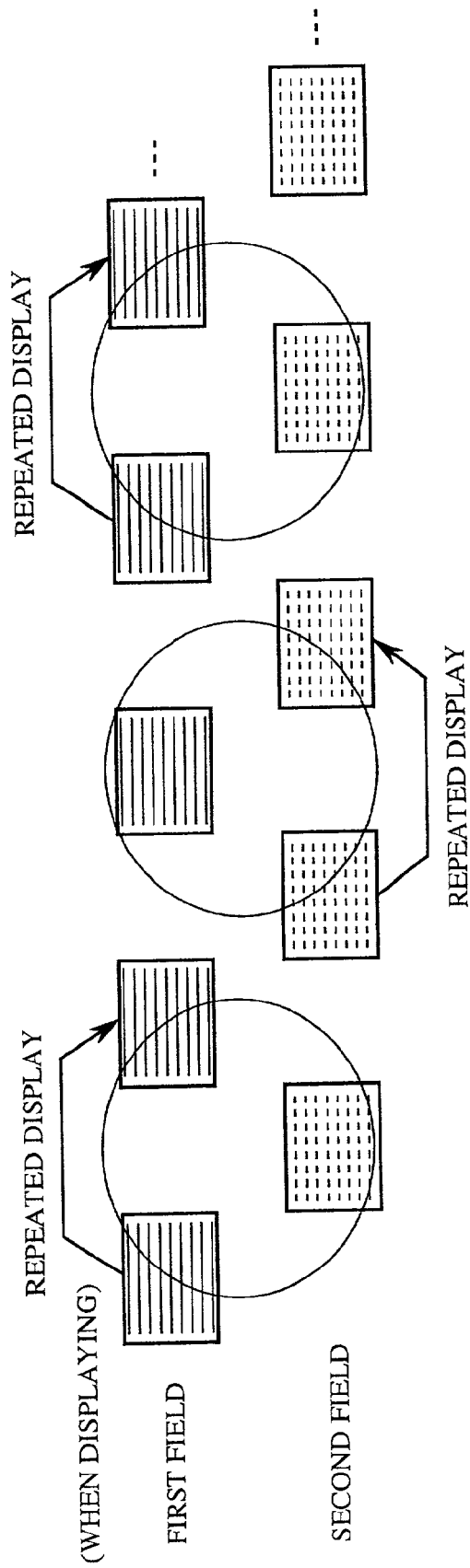

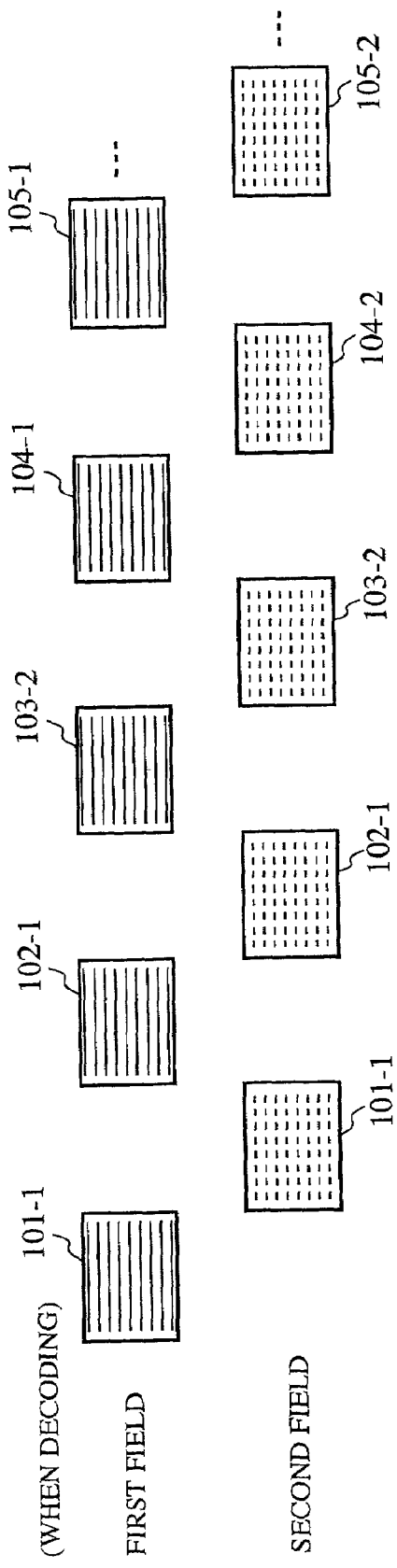

IMAGE CODING DEVICE AND METHOD OF IMAGE CODING

CROSS-REFERENCE TO THE RELATED APPLICATION

This Application is a continuation of International Application No. PCT/JP00/04263, whose international filing date is Jun. 28, 2000, the disclosures of which Application are incorporated by reference herein.

BACKGROUND OF THE INVENTION

1. Field of the Invention

The present invention relates to an image coding device, which is capable of coding motion image signals without affecting the frame rate thereof when output at the decoding side, and also relates to a method for coding motion image signals.

2. Description of the Related Art

When digitizing motion image signals, the resulting data amount often becomes enormous, and thus in the case for storing motion image signals in a recording medium such as an optical disk, or the case for broadcasting and/or communicating these motion image signals, a coding operation is applied to those motion image signals for the purpose of reducing the total data amount thereof.

Many coding methods for motion image signals have been proposed so far, and in the case of the MPEG method (Motion Picture Experts Group) for example, which is standardized in the international level by the ISO/IEC, a hybrid coding method composed by a combination of the DCT (Discrete Cosine Transform) coding and the inter-frame differential coding with MC (Motion Compensating Prediction) is employed.

In the inter-frame differential coding with the motion compensating prediction, a motion vector is calculated from a coded image and an image to be coded per blocks of a predetermined size, and the differential signal obtained from the both images and the motion vector are coded.

In the discrete cosine transform coding, the amount of data after coding (or coded amount) can be reduced by transforming an image to be coded or the above-mentioned differential signal from the spatial area to the frequency area, and quantizing the thus generated DCT coefficients in accordance with the step size in quantization in compliance with the transmission rate. This quantization step size is set to either one of preset areas (namely an integer number from 1 to 31 in the case of the MPEG method, for example), wherein if the quantization step size is made large, the total amount of coded data is greatly reduced, although the resultant image quality is deteriorated.

For example, in the digital broadcasting case, if the MPEG method is employed, the amount of coded data is normally compressed from 1/20 to 1/50. However, it is also well known that if the compression rate is to be made still higher, various noises in coding such as "block noise", "mosquito noise" and so on, which are perceptible to the human's ears, are generated, so that the resultant quality of the coded images is drastically deteriorated.

Due to these facts, in the case where higher rate of data compression is to be obtained, yet suppressing generation of the noise in coding at the same time, it has conventionally been completed out by skipping some frames in accordance with the characteristic of input motion image signals, using the motion image coding method as disclosed in Japanese Patent Application Laid Open No. 9-168155. In this case, if, for example, the H.261 method standardized by the ITU-T is employed for the coding operation, the coded data is decoded just as it is at the decoding side, and as for the image of the skipped frames, image of a frame preceding each of the excluded frames is displayed in a continued mode.

However, since the conventional image coding method is configured as explained above, in the coding system like the MPEG 2 method in which the frame rate of a motion image signal is set to a constant level when output at its decoding time, it cannot be arranged such that the coded data is decoded as it is at the decoding side, and the image of the frames preceding each of the skipped frames is displayed in succession for the image of the skipped frames. Due to this, there has been still a problem that when a coding system such as the MPEG 2 is employed in which it is prescribed such that the frame rate of a motion image signal is set to a constant level when output at its decoding time, a data compression with minimum deterioration of image quality, yet without affecting the frame rate output at the decoding side cannot be realized.

The present invention has been proposed to solve the problem aforementioned, and it is an object of the present invention to provide an image coding device, which is capable of carrying out a data compression with minimum deterioration of image quality, yet without affecting the frame rate output at the decoding side by controlling in advance the frame rate of an input image signal and/or image size as a preprocess, coding thereafter the thus controlled motion image signal on the basis of the preprocess using the coding system in which it is prescribed such that the frame rate of a motion image signal is set to a constant level when output at its decoding time, and outputting the thus coded data in conformity with the used coding method. It is also another object of the present invention to provide a method of image coding device.

SUMMARY OF THE INVENTION

According to the image coding device of the present invention, an input image controller executes a predetermined processing to an input motion image signal for reducing the amount of coded data when coding the motion image signal by a coding method in which it is designed such that the frame rate of a motion image signal is set to a constant level to be output at its decoding time, and outputs the processed motion image signal, together with the process information indicating the detail of the processing, whereas an image coder codes the motion image signal processed at the input image controller into a data in conformity with the coding method on the basis of the process information.

Due to this configuration, data compression without affecting the frame rate output from the decoding side, yet with minimum deterioration of the picture quality can be implemented. Further, since the coded data in conformity with that coding method is output, the amount of coding can be reduced even without changing the configuration of the decoding side.

According to the image coding device of the present invention, the image coder codes by the MPEG 2 method.

According to the image coding device of the present invention, the input image controller excludes either one field of each of the frames at a predetermined rate when the input motion image signal is of the interlace mode, and outputs the processed image signal together with the process information showing the thus excluded fields, and the image coder detects the exclusion of fields on the basis of the process information, and adds an instruction to output another field instead of the excluded field as overhead information, before coding the processed motion image signal.

According to the image coding device of the present invention, the input image controller excludes frames at a predetermined rate when the input motion image signal is of the progressive mode, and outputs the processed motion image signal together with the process information showing the thus excluded frames, and the image coder detects the exclusion of frames on the basis of the process information, and adds an instruction to output another frame instead of the excluded frame at the time of decoding as overhead information before coding the processed motion image signal.

According to the image coding device of the present invention, the input image controller excludes either one field of each of the frames at a predetermined rate when the input motion image signal is of the interlace mode, and outputs the processed image signal together with the process information showing the thus excluded fields, and the image coder detects the exclusion of fields on the basis of the process information, performs a predictive coding with respect to the thus excluded fields on the basis of the other fields, and generates a coded data corresponding to the excluded fields.

Due to this configuration, a predictive coding is applied to the skipped field, thereby to reduce the amount of coding.

According to the image coding device of the present invention, the image coder executes a predictive coding, regarding all the motion vectors in the horizontal and vertical directions as being "0".

According to the image coding device of the present invention, the image coder executes a predictive coding, regarding all the motion vectors in the horizontal direction as being "0", and all the motion vectors in the vertical direction as being either "+0.5" or "−0.5".

Due to this configuration, resolution of the decoded image in the vertical direction is made higher than the case in which the motion vector in the vertical direction is set to "0".

According to the image coding device of the present invention, the either the image coder or the input image controller observes a motion vector from two fields; namely preceding and following fields of each of the excluded fields, and the image coder interpolates the determined motion vector in accordance with each of the intervals between each of the excluded fields and the two fields, and executes a predictive coding about the excluded fields.

Due to this configuration, deterioration of the decoded image can be reduced.

According to the image coding device of the present invention, the image coder changes the size of a motion image signal, outputs the motion image signal after processing, and also outputs process information indicating that the image size has been changed, and the image coder detects frames whose image sizes have been changed within the whole processed motion image signal on the basis of the process information, and performs an intra-coding operation with respect to the first coded frame.

Due to this construction, data compression without affecting the frame rate output from the decoding side, yet with minimum deterioration of the picture quality can be implemented. Further, since the coded data in conformity with that coding method is output, the amount of coding can be reduced even without changing the configuration of the decoding side.

According to the image coding device of the present invention, the image coder changes the size of a motion image signal at the top of every predetermined image units, and the image coder performs an intra-coding operation with respect to the frame whose image size has been changed.

Due to this configuration, the frequency of coding in the in-frame coding mode can be reduced.

According to the image coding device of the present invention, the input image controller changes the size of a frame immediately after a GOP header.

Due to this configuration, the frequency of coding in the in-frame coding mode can be reduced.

According to the image coding device of the present invention, the input image controller suppresses high-frequency components of a motion image signal.

Due to this, the amount of coding can be reduced.

According to the image coding device of the present invention, the input image controller executes a predetermined processing in accordance with the picture mode of each frame.

Due to this configuration, in the case of I picture which is a base for a predictive coding, the input motion image signal is coded as it is, and thus more faithful coding can be realized.

According to the image coding device of the present invention, the input image controller determines the amount of coding at the image coder on the basis of at least either one of the discrete state of pixel values in each frame, the difference of pixels between frames and a motion vector, and executes a predetermined processing in accordance with the thus determined amount of coding.

Due to this construction, when the amount of coding is increased, a predetermined processing is conducted for reducing it, so that the amount of coding can be made close to a constant value.

According to the image coding device of the present invention, the input image controller determines the amount of coding at the image coder on the basis of the mode of pictured scene, and executes a predetermined processing in accordance with the thus determined mode of pictured scene.

Due to this construction, delay of processing and the entire circuit size can be minimized.

According to a method of image coding of the present invention, a predetermined processing to an input motion image signal for reducing the amount of coded data is executed when coding the motion image signal by a coding method in which it is designed such that the frame rate of a motion image signal is set to a constant level to be output at its decoding time, and the processed motion image signal and also process information indicating the detail of the processing are output, and the motion image signal processed at the input image controller is coded into a data in conformity with the coding method on the basis of the process information.

Due to this method, data compression without affecting the frame rate output from the decoding side, yet with minimum deterioration of the picture quality can be implemented. Further, since the coded data in conformity with that coding method is output, the amount of coding can be reduced even without changing the configuration of the decoding side.

According to the image coding device of the present invention, the input image controller which, in the case where the motion image signal is of the interlace mode, equalizes two fields of each frame at a predetermined rate, and outputs the thus processed motion image signal, and the image coder that codes the motion image signal processed at the input image controller by a decoding method which is in conformity with a method that is designed for outputting a motion image signal at a constant frame rate.

Due to this configuration, the efficiency of coding can be raised by raising the inter-relation of fields (specially the inner-relation in the vertical direction), even without changing the frame rate of the motion image signal to be coded, so that the amount of coding can be reduced.

BRIEF DESCRIPTION OF THE DRAWINGS

FIG. 2 is an illustration showing the configuration of a motion image signal of the interlace mode.

FIG. 6 is an illustration showing the relationship among an input motion image signal of the interlace mode, the motion image signal after the processing, and the motion image signal at the decoding side.

FIG. 7 is an exemplary view showing an example of the case in which one field of each group of three fields of an input interlace-mode motion image signal is skipped, and one of remaining two fields is output twice at the decoding side according to a second embodiment of the present invention.

FIG. 8 is an exemplary view showing one example of a motion image signal after control in the image coding device according to a third embodiment of the present invention.

DETAILED DESCRIPTION OF THE PREFERRED EMBODIMENTS

Several embodiments for carrying out best the present invention are now explained with reference to attached drawings, in order to explain the present invention to details.

[First Embodiment]

Figure 1:
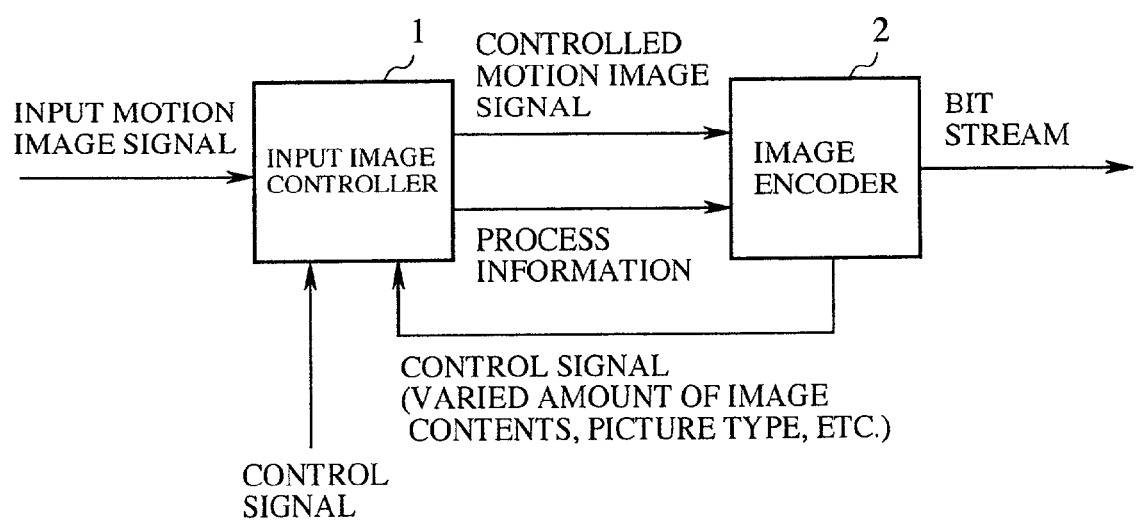
FIG. 1 is a schematic diagram showing the configuration of an image coding device according to a first embodiment of the present invention.

FIG. 1 is a schematic diagram showing the configuration of an image coding device according to a first embodiment of the present invention. In the figure, reference numeral 1 denotes an input image controller which, in the case where an input motion image signal is coded by a coding method such as the MPEG 2 (ISO/IEC 13818-2), which is standardized in the international level in conformity with the ISO/IEC, and prescribes such that the frame rate of a motion image signal should be made to a constant level before it is output, carries out a predetermined process with respect to the input motion image signal to reduce the amount of decoding, and also outputs the thus processed motion image signal, as well as the information showing the detail of the process for reducing the decoding amount (hereinafter may be referred to just as "process information"). Reference numeral 2 denotes an image coding device for coding the thus processed motion image signal (hereinafter may be referred to as a "motion image signal after control" or just as a "controlled image signal" fed from the input image controller 1 into a data in conformity with the coding method on the basis of the process information. It should be noted that when the MPEG 2 method is employed as a coding method, an image coder in compliance with the ISO/IEC 13818-2 is used for the image coder 2.

Next, the operation of the image coding device is now explained as below.

Figure 3:
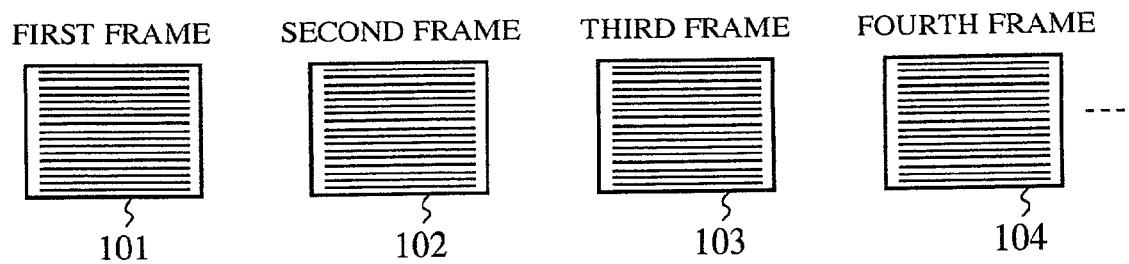
FIG. 3 is an illustration showing the configuration of a motion image signal of the progressive mode.

Here, the case in which the MPEG 2 is used as a coding method designed for outputting a motion image signal at a constant frame rate at the time of decoding is explained. In the MPEG 2 method, a coding method with respect to a motion image signal of the interlace mode and that with respect to a motion image signal of the progressive mode are provided. FIG. 2 is an illustration showing the configuration of a motion image signal of the interlace mode, whereas FIG. 3 is an illustration showing the configuration of a motion image signal of the progressive mode. As shown in FIG. 2, in the interlace mode, one field is composed by a signal scanned at every other lines, wherein two fields compose a motion image signal of one frame. On the other hand, as shown in FIG. 3, in the progressive mode, one frame is composed by a signal sequentially scanned at every one of lines.

The input image controller 1 carries out a predetermined process with respect to an input motion image signal in which the amount of coding is reduced when the input signal is coded by the MPEG 2 method, and gives a motion image signal after control and process information showing the details of the process to the image coder 2. The image coder 2 carries out coding of the motion image signal after control fed from the input image controller 1 into a data adaptive to the MPEG 2 on the basis of the process information, and outputs the thus coded data as a bit stream.

Here, the detailed operation of the input image controller 1 and the image coder 2 in the image coding device according to the first embodiment is now explained.

In the MPEG 2 method, it can be arranged at the time of coding, by use of overhead information (the value of the repeat-first-field and that of the top-field-first in the picture coding extension immediately after a picture header) such that the fields and/or frames are repeatedly displayed when they are decoded. It is to be noted that the repeat-first-field and the top-field-first in the picture coding extension are provided so as to be used when coding a motion image signal of 24 frames/second obtained from a picture film by 24 frames/second, and decoding the thus coded motion image signal into a motion image signal of 30 frames/second of the interlace mode or that of the 60 frames/second of the progressive mode at the time of decoding. In other words, generally the repeat-first-field and that of the top-field-first in the picture coding extension are used in the case where the frame rate of an input motion image signal is lower than that at the time of decoding.

Figure 4:
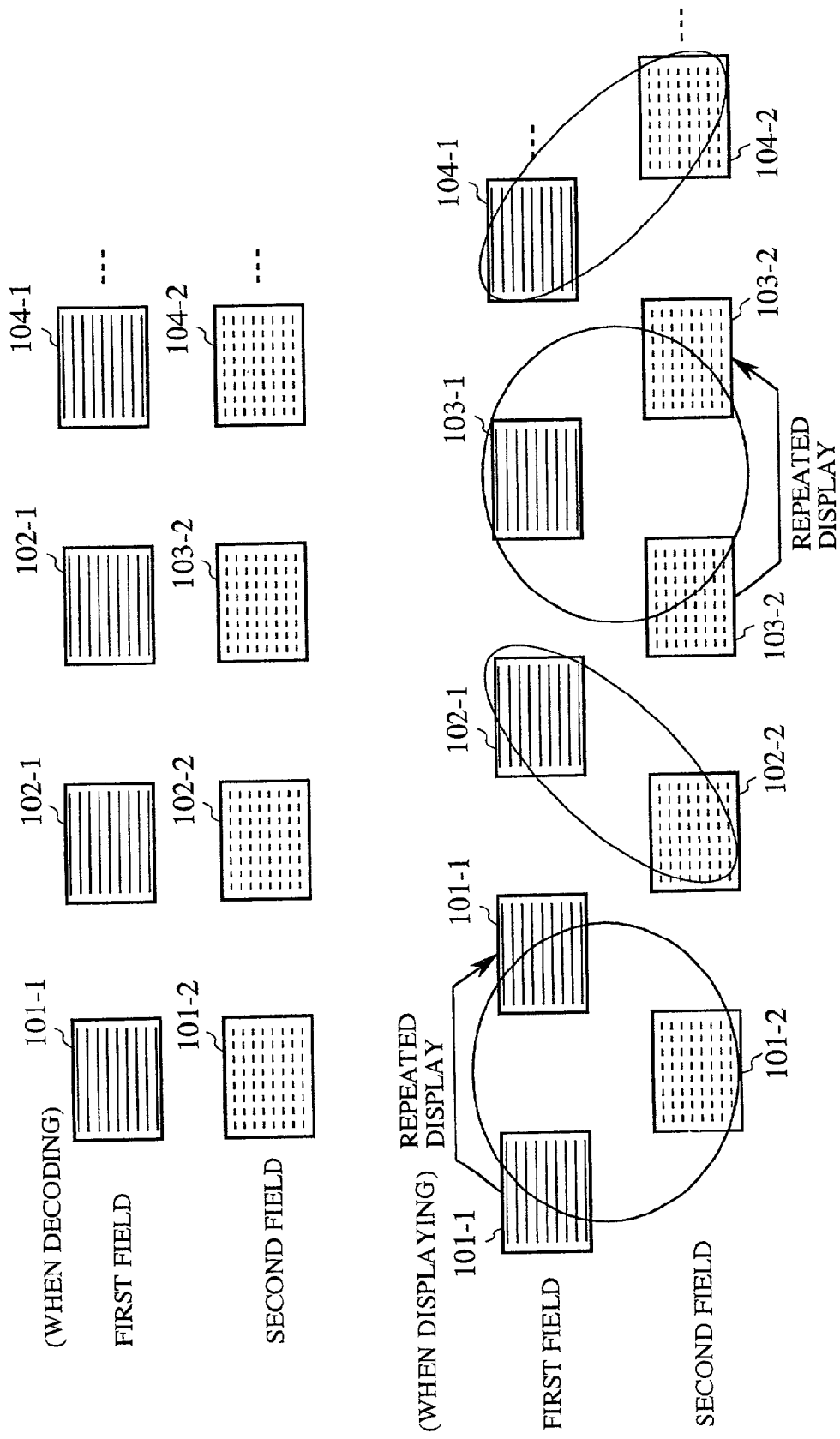
FIG. 4 is an illustration showing the relationship among each of the fields when outputting a coded motion image signal 4 frames of the interlace mode in 5 frames at the decoding side, by use of a repeat-first field or top-field first in the picture coding extension.

FIG. 4 is an illustration showing the relationship among each of the fields when an input motion image signal of 4 frames of the interlace mode is output in 5 frames at the decoding side by use of the repeat-first-field and the top-field-first in the picture coding extension. As shown in FIG. 4, for example, an input motion image signal of interlace-mode 4 frames; namely 101-1 to 104-2 is decoded, and a motion image signal of 4 frames is decoded on the basis of the repeat-first-field and the top-field-first in the picture coding extension, and a motion image signal of 5 frames is output by repeatedly outputting the fields 101-1 and 103-2.

Figure 5:
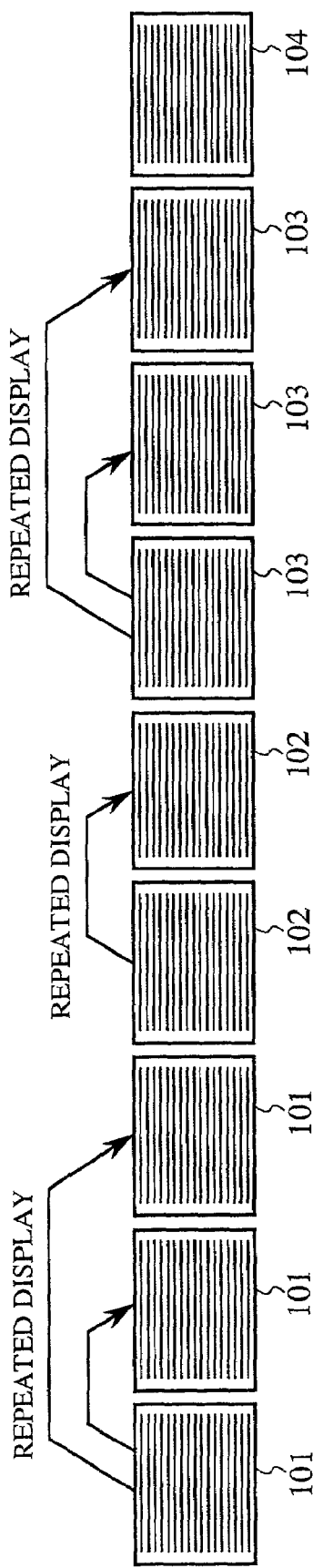
FIG. 5 is an illustration showing one example of the structure of a signal when outputting a coded motion image signal of 4 frames of the progressive mode in 9 frames at the decoding side, by use of a repeat-first field or top-field first in the picture coding extension.

FIG. 5 is an illustration showing one example of the structure of a signal when an input motion signal of the 4 frames of the progressive mode is output in 9 frames at the decoding side. In this case, as shown in FIG. 5, the progressive-mode input motion image signal of 4 frames 101 to 104 is decoded, and this 4-frame motion image signal of the progressive mode is decoded on the basis of the repeat-first-field and the top-field-first in the picture coding extension, and 9-frame motion image signal in total is output for example by repeatedly outputting the frame 101 three times, the frame 102 twice, the frame 103 three times and the frame 104 just once.

At this state, if the input motion image signal is of the interlace-mode 30 frames/second, the input image controller 1 skips some fields of the input motion image signal so that the signal is brought to be of 24 frames/second, and thereafter provides the thus processed motion image signal to the image coder 2, together with the process information showing the detail of the thus skipped fields.

The image coder 2 codes the motion image signal of 24 frames/second after control by setting overhead information, so that the motion image signal is decoded into a signal of 30 frames/second at the decoding side, and outputs the thus coded data as a bit stream. That is, the input control device 1 gives process information indicating that some fields have been skipped to the image coder 2, and when the image coder 2 receives the process information, it detects that some fields have been skipped, and thereafter it sets the overhead information such that other fields should be repetitively output instead of the skipped fields, and writes the thus set overhead information into the picture coding extension.

FIG. 6 is an exemplary view showing one example of the relationship among an input motion image signal of the interlace mode, the motion image signal after control, and the motion image signal at the decoding side. For example as shown in FIG. 6, among one of the fields 101-1, 101-2, ..., 105-1 and 105-2, the fields 102-1 and 104-2 are skipped by the input image controller 1, and the signal of other fields is fed to the image coder 2, and also the process information showing the fact that the fields 102-1 and 104-2 have been skipped is fed to the same. Thereafter, the motion image signal after control is coded by the MPEG 2, and the thus coded data is output as a bit stream. Then at the decoding side, the field 101-1 is repeatedly output as the first field of the next frame, and the field 103-2 is repetitively output as the second field of the next frame on the basis of the overhead information in the picture coding extension, so that the same frame rate as that of the input motion image signal can be maintained.

Further, if the input motion image signal is of the progressive mode, the input image controller 1 skips some frames at a predetermined rate, and gives the motion image signal after exclusion to the image decoder 2, together with the process information showing the thus skipped frames. The image coder 2 codes the motion image signal after control, by adding thereto overhead information arranged such that the motion image signal after control is decoded at the original frame rate at the decoding side, and outputs the thus decoded data as a bit stream.

It should be noted that when skipping fields and/or frames, delay in processing can be minimized by skipping the preceding one of fields and/or frames.

In this way, the frame rate of a motion image signal is reduced by the input image controller 1, and the motion image after control whose frame rate has been reduced is coded by the MPEG 2 method, whereas at the decoding side, the motion image signal after decoding is output at the same frame rate as that of the input motion image signal, with reference to the picture coding extension.

As explained above, according to the first embodiment of the present invention, since it is arranged such that the frame rate of a motion image signal is controlled as a preliminary processing, thereafter the thus controlled motion image signal is coded by the MPEG 2 method, and finally the data, which is in conformity with the MPEG 2 method includes overhead information is output, such an effect that the data compression without affecting the frame rate output from the decoding side, yet free of deterioration of picture quality is implemented can be obtained.

Further, since the data decoded in conformity with the MPEG 2 method is output, a currently diffused MPEG 2 decoder can be used at the decoding side, so that the amount of decoding can be reduced even without modifying the configuration of the decoding side.

[Second Embodiment]

The image coding device according to a second embodiment of the present invention is arranged such that the frame rate of the motion image signal after control is changed to another rate. It should be noted that the configuration of the image coding device according to the second embodiment is same as that of the first embodiment, so that the detailed explanation thereabout is omitted here.

Next, the operation of the image coding device of this embodiment is explained.

In the case where an input motion image signal is of the interlace mode, the input image controller 1 skips one field among each set of three fields, and the image coder 2 sets the overhead information such that one field out of each of the remaining sets of two fields is repetitively output twice at the decoding side, and codes the motion image signal after exclusion by the MPEG 2 method. FIG. 7 is an illustration showing one example of a motion image signal in the case where one field among each set of three fields is excluded, and one-field out of each of the remaining sets of two fields is repetitively output.

Due to this, if the frame rate of an input motion image signal is 30 frames/second, the frame rate after control becomes 20 frames/second. Note that it can also be arranged such that the frame rate after control can be arbitrarily changed between 20 frames/second and 30 frames/second.

In this case above also, the thus coded data is decoded with reference to the overhead information at the decoding side, and thereafter the thus decoded motion image signal is output at the 30 frames/second.

Further, if an input motion image signal is of the progressive mode 60 frames/second, due to the fact that one frame can be repetitively output for two or three frame terms on the basis of the overhead information, the input image controller 1 sets the frame rate of the motion image signal after control to an arbitrary frame rate between 20 frames/second and 60 frames/second, and the image coder 2 sets the overhead information corresponding to this, and codes the controlled motion image signal by the MPEG 2 method. In this case, the data after coding is decoded with reference to the overhead information at the decoding side, and the thus decoded motion image signal is output at the frame rate of 60 frames/second.

Since other operations are same as those of the first embodiment, the detailed explanation thereof is omitted here.

As explained above, according to the second embodiment of the present invention, apart from the effect of the first embodiment, such an effect that the amount of decoding can be reduced in accordance with the level of reduction of the frame rate can also be obtained.

[Third Embodiment]

The image coding device according to a third embodiment of the present invention is arranged such that a motion image signal after control is generated in such a manner that the first field and the second field of each frame of the input motion image signal are regarded as being the same fields, and that the frame rate of the motion image signal after control is not changed but same as that of the input motion image signal.

Note that the configuration of the image coding device according to the third embodiment is same as that of the first embodiment, so that the detailed explanation thereabout is omitted here. However, the input image controller 1 does not need to provide any process information to the image coder 2.

Next, the operation of the image coding device of this embodiment is explained.

FIG. 8 is an exemplary view showing one example of a motion image signal after control in the image coding device according to this third embodiment of the present invention.

As to each frame of an input motion image signal of the interlace mode 30 frames/second, the input image controller 1 outputs, as shown in FIG. 8, the same signal as that of the first fields 101-1 and 102-1, respectively of the first frame and the second frames, for the second field of the respective frames. The image coder 2 codes the motion image signal after control whose first field and the second field are the same.

Note that the same signal as that of the first field may be output for the second field just as the first and the second frames in FIG. 8, or the same signal as that of the second field may be output for the first field just as the case of the third frame in FIG. 8.

Since other operations are same as those of the first embodiment, the detailed explanation thereof is omitted here. In this case, there is no need to set the overhead information.

As explained above, since it is arranged according to the third embodiment of the present invention such that if a motion image signal is of the interlace mode, two fields of some of the frames are made to be same at a predetermined rate, the efficiency of coding by the MPEG 2 method can be raised by raising the inter-field correlation (specially the correlation in the vertical direction), even without changing the frame rate of the motion image signal to be coded, so that the amount of coding can be reduced as a whole.

[Fourth Embodiment]

The image coding device according to a fourth embodiment of the present invention is arranged such that in the case where a motion image signal is of the interlace mode, the input image controller 1 excludes one field of some of the frames at a predetermined rate, and outputs the motion image signal after control as well as the process information showing the detail of the excluded field, whereas the image coder 2 detects the exclusion of the field on the basis of the process information, and performs a predictive coding about the thus excluded field on the basis of the other field, and thereafter generates a coded data corresponding to the excluded field.

Note that since the configuration of the image coding device according to the fourth embodiment is same as that of the first embodiment, the detailed explanation thereof is omitted here.

Next, the operation of the image coding device of this embodiment is explained.

The input image controller 1 excludes, in the case where a motion image signal is of the interlace mode, either one field of some of the frames at a predetermined rate, and outputs the motion image signal after control as well as the process information showing the excluded field. The image coder 2 adopts a field construction in which each field within one frame is coded individually, wherein it codes the field which has not been skipped in the normal procedure, whereas with respect to the skipped field, it carries out a one-directional prediction from the precedingly coded field. In this state, the image coder 2 sets the motion vector with respect to all the macro blocks (horizontal component and vertical component) to the value (0, 0), and suppresses the coding of the differential signal. By doing so, as to the skipped fields, no coding is executed to most of the macroblocks, and thus the amount of coding will be almost none. Note that at the decoding side, a signal of the preceding field is repetitively output for the field that has been skipped.

It should be noted that by setting the motion vector to either (0, −0.5) or (0, +0.5) instead of (0, 0), an interpolation signal is generated from a signal between the upper and the lower lines, so that the vertical resolution of the image after decoding is made higher than the case where the same image signal is repeated, that is, the case where the motion vector is (0, 0).

Further, by setting the motion vector of the same value to the whole field image, or per slice unit (area composed by a plurality of macroblocks), the reduction of time resolution can be suppressed even without increasing the amount of decoding.

It is to be noted that for the motion vector to be used when executing a predictive coding with respect to the skipped field, one obtained by interpolation from the motion vector between two or more than two fields before and after the excluded field may be used. That is, in the case where the motion of 10 pixels is detected with respect to the whole screen between the first field to be coded in the normal method and the next first field to be coded in the normal method, a predictive coding with respect to the second field is carried out by the motion vector of 5 pixels of the intermediate value. In this case, the magnitude of motion can be obtained by adding the function of measuring the motion to the input image controller 1, or by averaging the whole field image or per slice unit detected in every macro blocks at the image coder 2.

Further, instead of obtaining the vector by interpolation from the fields before and after the current field, the substantially same effect can be obtained even by extrapolation from the vector value of the preceding field.

Note that since other operations are same as those of the first embodiment, the detailed explanation thereof is omitted here. In this case, there is no need to set the overhead information.

As explained above, it is arranged according to the fourth embodiment of the present invention such that in the case where a motion image signal is of the interlace mode, the input image coder 1 excludes one filed of some of the frames at a predetermined rate, and outputs the motion image signal after control as well as the process information showing the excluded field, whereas the image coder 2 detects the exclusion of the field on the basis of the process information, and performs a predictive coding about the thus excluded field on the basis of the other field of the corresponding excluded field, and thereafter generates a coded data that corresponds to the excluded field.

Due to this arrangement, a predictive coding is carried out with respect to the skipped field, and the amount of coding can thus be reduced. When one of two fields is skipped, the amount of coding generated about the skipped frame can be reduced to a half the case in which no skipping is carried out.

On the other hand, in the case where the magnitude of motion is different per each section in the screen, a motion vector is set per each slice, so that a motion image signal having more smooth movement can be decoded at the decoding side.

[Fifth Embodiment]

The image coding device according to a fifth embodiment of the present invention is arranged such that it determines whether or not to execute a predetermined processing with respect to an input motion image signal, depending on what type of picture the coded image signal is. Note that the configuration of the image coding device according to the fifth embodiment is same as that of the first embodiment, so that the detailed explanation thereabout is omitted here.

Next, the operation of the image coding device of this embodiment is explained.

The input image controller 1 reads out the picture mode of each frame from the image coder 2 in advance. For example, no skipping is carried out with respect to the frame of I picture (intra-coded picture), whereas a skipping is performed to B picture (bidirectionally predictive-coded picture) which is not used for prediction of other image. Note that since P picture (Predictive-coded picture) is used for predicting B picture, when the amount of coding generated is small, it is not skipped, or otherwise it is skipped with priority.

As explained above, since the image coding device according to the fifth embodiment of the present invention is arranged such that it determines whether or not to carry out a predetermined processing with respect to an input motion image signal depending on what type of picture the coded image signal is, in the case of I picture which is a base for the predictive coding, an input motion image signal is coded just as it is, so that the more faithful coding can be realized.

[Sixth Embodiment]

The image coding device according to a sixth embodiment of the present invention is arranged such that it determines whether or not to carry out a predetermined processing with respect to an input motion image signal depending on what type of picture it is, just as the case of the fifth embodiment. Note that the configuration of the image coding device according to the sixth embodiment is same as that of the first embodiment, so that the detailed explanation thereabout is omitted here.

Next, the operation of the image coding device of this embodiment is explained.

The input image controller 1 reads out the picture mode of each frame from the image coder 2 in advance, and in the case of B picture, only one field is output as a controlled image signal, whereas the other field is skipped, and thereafter the image coder 2 carries out a predictive coding about the thus skipped field. Note that since P picture is used for predicting B picture, no filed is skipped when the amount of coding generated is small, or otherwise it is skipped with priority.

Note that since other operations are same as those of the first embodiment, the detailed explanation thereof is omitted here.

As explained above, since the image coding device according to the sixth embodiment of the present invention is arranged such that it determines whether or not to execute a predetermined processing with respect to an input motion image signal depending on the picture type thereof, in the case of I picture which is a base for the predictive coding, an input motion image signal is coded just as it is, so that the more faithful coding can be realized.

[Seventh Embodiment]

The image coding device according to a seventh embodiment of the present invention is arranged such that the input image controller 1 determines the amount of coding at the image coder 2 on the basis of at least one of the dispersion of pixel values in each frame, the difference of the pixel values between frames and the motion vector, and executes a predetermined processing in accordance with the thus determined amount of coding. Note that the configuration of the image coding device according to the seventh embodiment is same as that of the first embodiment, so that the detailed explanation thereabout is omitted here.

Next, the operation of the image coding device of this embodiment is explained.

Either the input image controller 1 or the image coder 2 calculates the change in the image contents such as the dispersion of pixel values, the difference of pixels between frames, the motion vector and so on, and the image coder 2 determines the amount of data of the data coded by the image coder 2 on the basis of the thus calculated change of the image contents.

Normally, when the magnitude of change in the contents of image is large, the amount of coding is also made large, whereas when it is small, the amount of coding is also made small. Due to this, the input image controller 1 outputs an input motion image signal just as it is when the magnitude of change is small, whereas when the magnitude of change is large, it carries out the predetermined processing as mentioned in other embodiments.

Note that other operations are same as those explained in either one of other embodiments, the detailed explanation thereabout is omitted here.

As explained above, the image coding device according to the seventh embodiment of the present invention is arranged such that the input image controller 1 determines the amount of coding at the image coder 2 on the basis of at least one of the dispersion of pixel values in each frame, the difference of the pixel values between frames and the motion vector, and executes a predetermined processing in accordance with the thus determined amount of coding, so that such an effect can be obtained that when the amount of coding is made large, a predetermined processing is executed for minimizing the amount of coding so as to make the amount of coding converged to a constant level.

[Eighth Embodiment]

The image coding device according to an eighth embodiment of the present invention is arranged such that the input image controller 1 changes the image size of a motion image signal at predetermined intervals, and the image coder 2 executes an intra-coding operation to the frames whose image size has been varied at predetermined intervals. Note that the configuration of the image coding device according to the eighth embodiment is same as that of the first embodiment, so that the detailed explanation thereabout is omitted here.

Next, the operation of the image coding device of this embodiment is explained.

When the amount of coding generated by the image coder 2 is increased, the input image controller 1 minimizes the image size of the frame or the field of an input motion image signal. The image coder 2 codes the thus processed motion image signal. On this occasion, since a predictive operation between images of different image size is quite difficult, the first coded frame whose image size has been varied is intra-coded by the image coder 2.

Note that since the other operations are same as those of the seventh embodiment, the detailed explanation thereabout is omitted here. Further, the variation of image size of this embodiment can be combined with the predetermined processing explained in other embodiments.

As explained above, the image coding device according to an eighth embodiment of the present invention is arranged such that the image size of a motion image signal is controlled as a preprocessing, and the thus controlled motion image signal is coded by the MPEG 2 method, and thereafter the coded data in conformity with the MPEG 2 method is output, so that the data compression with minimum deterioration of image quality, yet without affecting the frame rate output from the decoding side can be obtained. Further, since the coded data in conformity with the MPEG 2 method is output, the conventionally diffused normal MPEG 2 decoder can be used at the decoding side, whereby the amount of decoding can be reduced without changing the configuration of the decoding side.

[Ninth Embodiment]

The image coding device according to a ninth embodiment of the present invention is arranged such that when changing the image size in the image coding device of the eighth embodiment, the image size is changed from immediately after the GOP (Group Of Picture) header. The GOP is an image unit employed in the MPEG 2 method. Note that the configuration of the image coding device according to the ninth embodiment is same as that of the first embodiment, so that the detailed explanation thereabout is omitted here.

Next, the operation of the image coding device of this embodiment is explained.

The GOP is composed of a GOP header and a plurality of pictures, and the frame immediately after the GOP header is coded in the intra-coding mode. For the bit stream from a digital broadcast or a recording medium such as DVD (Digital Versatile Disk), GOP headers are inserted at predetermined intervals.

For this reason, when the image size is changed, the input image controller 1 waites until the next GOP header is detected, and thereafter when it is detected, then the image size of the frame immediately after the GOP header is changed.

Note that since the other operations are same as those of the eighth embodiment, the detailed explanation thereabout is omitted here.

As explained above, according to the ninth embodiment, in the case where the image size in changed, the image size of the frame immediately after the GOP header is changed, so that the frequency of coding in the intra-coding mode can be reduced.

[Tenth Embodiment]

The image coding device according to a tenth embodiment of the present invention is arranged such that it suppresses high frequency component of an input motion image signal. Note that the configuration of the image coding device according to the tenth embodiment is same as that of the first embodiment, so that the detailed explanation thereabout is omitted here.

Next, the operation of the image coding device of this embodiment is explained.

When the amount of coding generated by the image coder 2 is increased, the input image controller 1 excludes high frequency components by performing a low-pass filtering process with respect to the input motion image signal. In this case, an inter-frame predictive coding can be applied to the processed frame, so that there is no need to carry out an intra-coding operation like the case of changing the image size.

Note that since the other operations are same as those of the seventh embodiment, the detailed explanation thereabout is omitted here.

As explained above, the image coding device according to the tenth embodiment of the present invention is arranged such that high frequency components are suppressed, so that such an effect that the amount of coding can be reduced. Further, in the case where image signals of different bands are to be coded, if the quantizing step size is greatly varied, the picture quality of the decoded image is also greatly impaired, so that if it is arranged such that the limitation of variation in the size of the quantizing step is preliminarily set, and the size of the quantizing step is changed only within the thus set limitation, the total efficiency can be raised.

[Eleventh Embodiment]

The image coding device according to an eleventh embodiment of the present invention is arranged such that it carries out a predetermined process in accordance with the change from one program to another, from one scene to another and so on. Note that the configuration of the image coding device according to the eleventh embodiment is same as that of the first embodiment, so that the detailed explanation thereabout is omitted here.

Next, the operation of the image coding device of this embodiment is explained.

For example there are cases in which the amount of change in the image contents is preliminarily known just like the case in which a program of relatively small-scale movement pictured in an in-house studio or the like is switched to a sport program or the like pictured in an outdoor field, or the case of a news program in which a scene picturing an announcer in a studio or the like is switched to another scene picturing many people crowded in the out-door field and so forth.

Considering these situations above, it is arranged in such a manner that when there is a change in the type of program, scene and so on, a control signal indicating the occurrence of such change is input to the input image controller 1, and the input image controller 1 executes a predetermined process in accordance with the control signal just as the above-mentioned embodiment. That is, the input image controller 1 generates, in the case of relatively small-motion scene, a motion image signal after control from the input image signal without changing the frame rate and/or image size, whereas in the case of relatively large-motioned scene, it skips fields and/or frames, minimizing the image size and so on.

Note that since other operations are same as those of the ninth embodiment, the detailed explanation thereabout is omitted here.

As explained above, the image coding device according to the eleventh embodiment of the present invention is arranged such that it executes a predetermined process in accordance with the change from one program to another, from one scene to another and so on, a predetermined process can be executed even without measuring the dispersion of pixel values or the like of the screen from the input motion image signal, resulting in an effect that a delay in process or circuit size can be reduced.

Note that in the above embodiment, the case in which MPEG 2 method is employed is explained into detail.

However, it goes without saying that other coding methods having the same function can also be employed.

As explained heretofore, the present invention is suitable to code a motion image signal in the case of performing digital broadcasts, or to code a motion image signal in the case of recording a motion image data into a recording medium.

What is claimed is:

1. An image coding device for coding a motion image signal, and outputting the coded data as a bit stream, said image coding device comprising:
   an input image controller that executes a predetermined processing to an input motion image signal for reducing the amount of coded data when coding the motion image signal by a coding method in which it is prescribed that the frame rate of a motion image signal is set to a constant level to be output at its decoding time, and outputs the processed motion image signal, together with the process information indicating the detail of said processing; and
   an image coder for coding the motion image signal processed at said input image controller into a data in conformity with said coding method on the basis of said process information;
   wherein said input image controller excludes either one field of each of the frames at a predetermined rate when the input motion image signal is of the interlace method, and outputs the processed motion image signal, together with the process information showing the thus excluded fields, and
   said image coder detects the exclusion of fields on the basis of said process information, performs a predictive coding with respect to the thus excluded fields on the basis of the other fields, and generates a coded data corresponding to said excluded fields.

2. An image coding device for coding a motion image signal, and outputting the coded data as a bit stream, said image coding device comprising:
   an input image controller that executes a predetermined processing to an input motion image signal for reducing the amount of coded data when coding the motion image signal by a coding method in which it is prescribed that the frame rate of a motion image signal is set to a constant level to be output at its decoding time, and outputs the processed motion image signal, together with the process information indicating the detail of said processing; and
   an image coder for coding the motion image signal processed at said input image controller into a data in conformity with said coding method on the basis of said process information;
   wherein said input image controller excludes either one field of each of the frames at a predetermined rate when the input motion image signal is of the interlace method, and outputs the processed motion image signal, together with the process information showing the thus excluded fields;
   said image coder detects the exclusion of fields on the basis of said process information, performs a predictive coding with respect to the thus excluded fields on the basis of the other fields, and generates a coded data corresponding to said excluded fields; and
   said image coder executes a predictive coding, considering all the motion vectors in the horizontal and vertical directions to be "0".

3. An image coding device for coding a motion image signal, and outputting the coded data as a bit stream, said image coding device comprising:
   an input image controller that executes a predetermined processing to an input motion image signal for reducing the amount of coded data when coding the motion image signal by a coding method in which it is prescribed that the frame rate of a motion image signal is set to a constant level to be output at its decoding time, and outputs the processed motion image signal, together with the process information indicating the detail of said processing; and
   an image coder for coding the motion image signal processed at said input image controller into a data in conformity with said coding method on the basis of said process information;
   wherein said input image controller excludes either one field of each of the frames at a predetermined rate when the input motion image signal is of the interlace method, and outputs the processed motion image signal, together with the process information showing the thus excluded fields;
   said image coder detects the exclusion of fields on the basis of said process information, performs a predictive coding with respect to the thus excluded fields on the basis of the other fields, and generates a coded data corresponding to said excluded fields; and
   said image coder executes a predictive coding, considering all the motion vectors in the horizontal direction to be "0", and all the motion vectors in the vertical direction to be either "+0.5" or "−0.5".

4. An image coding device for coding a motion image signal, and outputting the coded data as a bit stream, said image coding device comprising:
   an input image controller that executes a predetermined processing to an input motion image signal for reducing the amount of coded data when coding the motion image signal by a coding method in which it is prescribed that the frame rate of a motion image signal is set to a constant level to be output at its decoding time, and outputs the processed motion image signal, together with the process information indicating the detail of said processing; and
   an image coder for coding the motion image signal processed at said input image controller into a data in conformity with said coding method on the basis of said process information;
   wherein said input image controller excludes either one field of each of the frames at a predetermined rate when the input motion image signal is of the interlace method, and outputs the processed motion image signal, together with the process information showing the thus excluded fields,
   said image coder detects the exclusion of fields on the basis of said process information, performs a predictive coding with respect to the thus excluded fields on the basis of the other fields, and generates a coded data corresponding to said excluded fields;
   either said image coder or said input image controller observes a motion vector from two fields; namely preceding and following fields of each of said excluded fields, and
   said image coder interpolates said determined motion vector in accordance with each of the intervals between each of said excluded fields and said two fields, and executes a predictive coding about said excluded fields.

5. A method of image coding for coding a motion image signal and outputting the thus coded data as a bit stream, said method comprising the steps of:

executing a predetermined processing to an input motion image signal for reducing the amount of coded data when coding the motion image signal by a coding method in which it is prescribed that the frame rate of a motion image signal is set to a constant level to be output at its decoding time, and outputting the processed motion image signal, together with the process information indicating the detail of said processing, and coding the motion image signal processed at said input image controller into a data in conformity with said coding method on the basis of said process information.

6. An image coding device for coding a motion image signal and outputting the thus coded data as a bit stream, said device comprising:

an input image controller which, in the case where the motion image signal is of the interlace mode, equalizes two fields of each frame at a predetermined rate, and outputs the thus processed motion image signal, and an image coder that codes the motion image signal processed at said input image controller by a decoding method which is in conformity with a method that is designed for outputting a motion image signal at a constant frame rate.

7. The image coding device according to claim 1, wherein the input image controller executes the predetermined processing to the motion image signal when the frame rate of the motion image signal is greater than a predetermined frame rate.

8. The image coding device according to claim 1, wherein the predetermined processing that is executed by the input image controller includes excluding a field or frame of the motion image signal such that the frame rate of the motion image signal is reduced to a predetermined frame rate.

9. The image coding device according to claim 8, wherein the process information indicates which fields or frames have been excluded.

10. The image coding method according to claim 5, wherein the predetermined processing to the input motion image signal is executed when the frame rate of the motion image signal is greater than a predetermined frame rate.

11. The image coding method according to claim 5, wherein the predetermined processing includes excluding a field or frame of the motion image signal such that the frame rate of the motion image signal is reduced to a predetermined frame rate.

12. The image coding device according to 11, wherein the process information indicates which fields or frames have been excluded.

13. The image coding device according to claim 6, wherein the input image controller executes the predetermined processing to the motion image signal when the frame rate of the motion image signal is greater than a predetermined frame rate.

14. The image coding device according to claim 6, wherein the predetermined processing that is executed by the input image controller includes excluding a field or frame of the motion image signal such that the frame rate of the motion image signal is reduced to a predetermined frame rate.

15. The image coding device according to claim 14, wherein the process information indicates which fields or frames have been excluded.

16. The image coding device according to claim 1, wherein said coding method is the MPEG 2.

17. The image coding device according to claim 1, wherein said input image controller excludes either one field of each of the frames at a predetermined rate when the input motion image signal is of the interlace mode, and outputs the processed motion image signal together with the process information showing the thus excluded fields, and said image coder detects the exclusion of fields on the basis of said process information, and adds an instruction to output another field instead of the excluded field at the time of decoding as overhead information before coding said processed motion image signal.

18. The image coding device according to claim 1, wherein said input image controller excludes frames at a predetermined rate when the input motion image signal is of the progressive mode, and outputs the processed motion image signal together with the process information showing the thus excluded frames, and said image coder detects the exclusion of frames on the basis of said process information, and adds an instruction to output another frame field instead of the excluded frame at the time of decoding as overhead information before coding said processed motion image signal.

19. The image coding device according to claim 1, wherein said image coder changes the size of a motion image signal, outputs the motion image signal after processing, and also outputs process information indicating that the image size has been changed, and said image coder detects frames whose image sizes have been changed within the whole processed motion image signal on the basis of the process information, and performs an intra-coding operation with respect to the first coded frame.

20. The image coding device according to claim 19, wherein said image coder changes the size of a motion image signal at the top of every predetermined image units, and said image coder performs an intra-coding operation with respect to the frame whose image size has been changed.

21. The image coding device according to claim 20, wherein said input image controller changes the size of a frame immediately after a GOP header.

22. The image coding device according to claim 1, wherein said input image controller suppresses high-frequency components of a motion image signal.

23. The image coding device according to claim 1, wherein said input image controller executes a predetermined processing in accordance with the picture mode of each frame.

24. The image coding device according to claim 1, wherein said input image controller determines the amount of coding at the image coder on the basis of at least either one of the discrete state of pixel values in each frame, the difference of pixels between frames and a motion vector, and executes a predetermined processing in accordance with the thus determined amount of coding.

25. The image coding device according to claim 1, wherein said input image controller determines the amount of coding at the image coder on the basis of the mode of pictured scene, and executes a predetermined processing in accordance with the thus determined mode of pictured scene.

* * * * *